United States Patent
Sheridan

(10) Patent No.: US 9,879,694 B2
(45) Date of Patent: Jan. 30, 2018

(54) TURBO-COMPRESSOR WITH GEARED TURBOFAN

(71) Applicant: UNITED TECHNOLOGIES CORPORATION, Hartford, CT (US)

(72) Inventor: William G. Sheridan, Southington, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 340 days.

(21) Appl. No.: 14/612,614

(22) Filed: Feb. 3, 2015

(65) Prior Publication Data
US 2016/0222814 A1  Aug. 4, 2016

(51) Int. Cl.
| | | |
|---|---|---|
| F04D 27/02 | (2006.01) | |
| F04D 29/32 | (2006.01) | |
| F02K 3/04 | (2006.01) | |
| F02C 3/073 | (2006.01) | |
| F02C 3/107 | (2006.01) | |
| F02C 7/36 | (2006.01) | |
| F01D 9/04 | (2006.01) | |
| F01D 13/00 | (2006.01) | |
| F01D 25/16 | (2006.01) | |

(52) U.S. Cl.
CPC .......... *F04D 29/324* (2013.01); *F01D 9/041* (2013.01); *F01D 13/006* (2013.01); *F01D 25/162* (2013.01); *F02C 3/073* (2013.01); *F02C 3/107* (2013.01); *F02C 7/36* (2013.01); *F02K 3/04* (2013.01); *F05D 2250/311* (2013.01); *F05D 2260/40311* (2013.01)

(58) Field of Classification Search
CPC ....................................................... F02K 3/04
USPC ............................................................ 415/1
See application file for complete search history.

(56) References Cited

U.S. PATENT DOCUMENTS

| | | |
|---|---|---|
| 2,154,532 A | 4/1939 | Ryder |
| 2,391,779 A | 12/1945 | Griffith |
| 2,548,975 A | 4/1951 | Hawthorne |
| 3,101,170 A | 8/1963 | Paulecka |
| 3,103,325 A | 9/1963 | Leutzinger |
| 3,186,166 A * | 6/1965 | Grieb ...................... F01D 11/04 415/116 |
| 3,814,549 A * | 6/1974 | Cronstedt ............... F01D 25/04 415/119 |
| 4,301,649 A | 11/1981 | Walker |
| 5,102,379 A | 4/1992 | Pagluica et al. |
| 5,389,048 A | 2/1995 | Carlson |
| 5,433,674 A | 7/1995 | Sheridan et al. |
| 5,466,198 A | 11/1995 | McKibbin et al. |
| 5,685,797 A | 11/1997 | Barnsby et al. |
| 6,223,616 B1 | 5/2001 | Sheridan |
| 6,964,155 B2 | 11/2005 | McCune et al. |
| 8,191,352 B2 | 6/2012 | Schilling |

(Continued)

OTHER PUBLICATIONS

Jane's Aero-Engines, Edited by Bill Gunstron, Issue Seven, Mar. 2000. pp. 510-512.

(Continued)

*Primary Examiner* — Umashankar Venkatesan
(74) *Attorney, Agent, or Firm* — Carlson, Gaskey & Olds, P.C.

(57) ABSTRACT

A gas turbine engine includes a fan section. A turbo-compressor section is connected to the fan section through a speed change mechanism.

11 Claims, 2 Drawing Sheets

(56) References Cited

U.S. PATENT DOCUMENTS

| | | |
|---|---|---|
| 8,261,527 B1 | 9/2012 | Stearns et al. |
| 8,484,942 B1 | 7/2013 | McCune et al. |
| 2005/0060983 A1 | 3/2005 | Lardellier |
| 2011/0056208 A1 | 3/2011 | Norris et al. |
| 2011/0206498 A1 | 8/2011 | McCooey |
| 2013/0186058 A1 | 7/2013 | Sheridan et al. |
| 2013/0259650 A1* | 10/2013 | Schwarz .................. F01D 1/24 415/122.1 |
| 2013/0319006 A1* | 12/2013 | Parnin ..................... F01D 25/18 60/805 |

OTHER PUBLICATIONS

Performance and Weight Estimates for an Advanced Open Rotor Engine, Eric S. Hendricks and Michael T. Tong, NASA/TM-2012-217710, AIAA-2012-3911, Sep. 2012, pp. 1-13.

Ciepluch et al., "Quiet, Powered-Lift Propulsion," NASA Conference Publication 2077, Nov. 14-15, 1978 (429 pages).

Civil Turbojet/Turbofan Specifications. Website: http://www.jet-engine.net/civtfspec.html.

Extended European Search Report for European Application No. 16153787.3 dated Jun. 6, 2016.

\* cited by examiner

TURBO-COMPRESSOR WITH GEARED TURBOFAN

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The gas turbine engine generally includes at least two spools arranged concentrically with a first spool extending axially within a second spool. However, concentrically rotating shafts that extend within each other can be difficult to manufacture and maintain.

SUMMARY

In one exemplary embodiment, a gas turbine engine includes a fan section. A turbo-compressor section is connected to the fan section through a speed change mechanism.

In a further embodiment of the above, the turbo compressor section includes at least one rotor stage that has a plurality of blades. Each of the plurality of blades includes a low pressure compressor portion and a low pressure turbine portion.

In a further embodiment of any of the above, the low pressure compressor portion is located radially inward from the low pressure turbine portion.

In a further embodiment of any of the above, a shroud separates the low pressure compressor portion and the low pressure turbine portion.

In a further embodiment of any of the above, there is a high speed spool and a low speed spool.

In a further embodiment of any of the above, the low speed spool is spaced axially forward of the high speed spool.

In a further embodiment of any of the above, the low speed spool connects the turbo-compressor section to the speed change mechanism.

In a further embodiment of any of the above, the high speed spool connects a high pressure compressor and a high pressure turbine.

In a further embodiment of any of the above, a mid-turbine passage has a first portion that extends downstream from the high pressure turbine and a second portion that extends upstream toward the turbo-compressor section.

In a further embodiment of any of the above, the mid-turbine passage includes a plurality of ducts.

In a further embodiment of any of the above, the mid-turbine passage includes a plenum.

In a further embodiment of any of the above, an exhaust passage fluidly connects the turbo-compressor section to a bypass air duct.

In another exemplary embodiment, a method of operating a gas turbine engine includes rotating a plurality of turbo-compressor blades attached to a low speed spool and reducing a rotational output of the low speed spool with a speed change mechanism to rotate a fan section.

In a further embodiment of any of the above, each of the turbo-compressor blades includes a low pressure compressor portion and a low pressure turbine portion.

In a further embodiment of any of the above, the low pressure compressor portion is located radially inward from the low pressure turbine portion.

In a further embodiment of any of the above, a shroud separates the low pressure compressor portion and the low pressure turbine portion.

DETAILED DESCRIPTION

Figure 1:
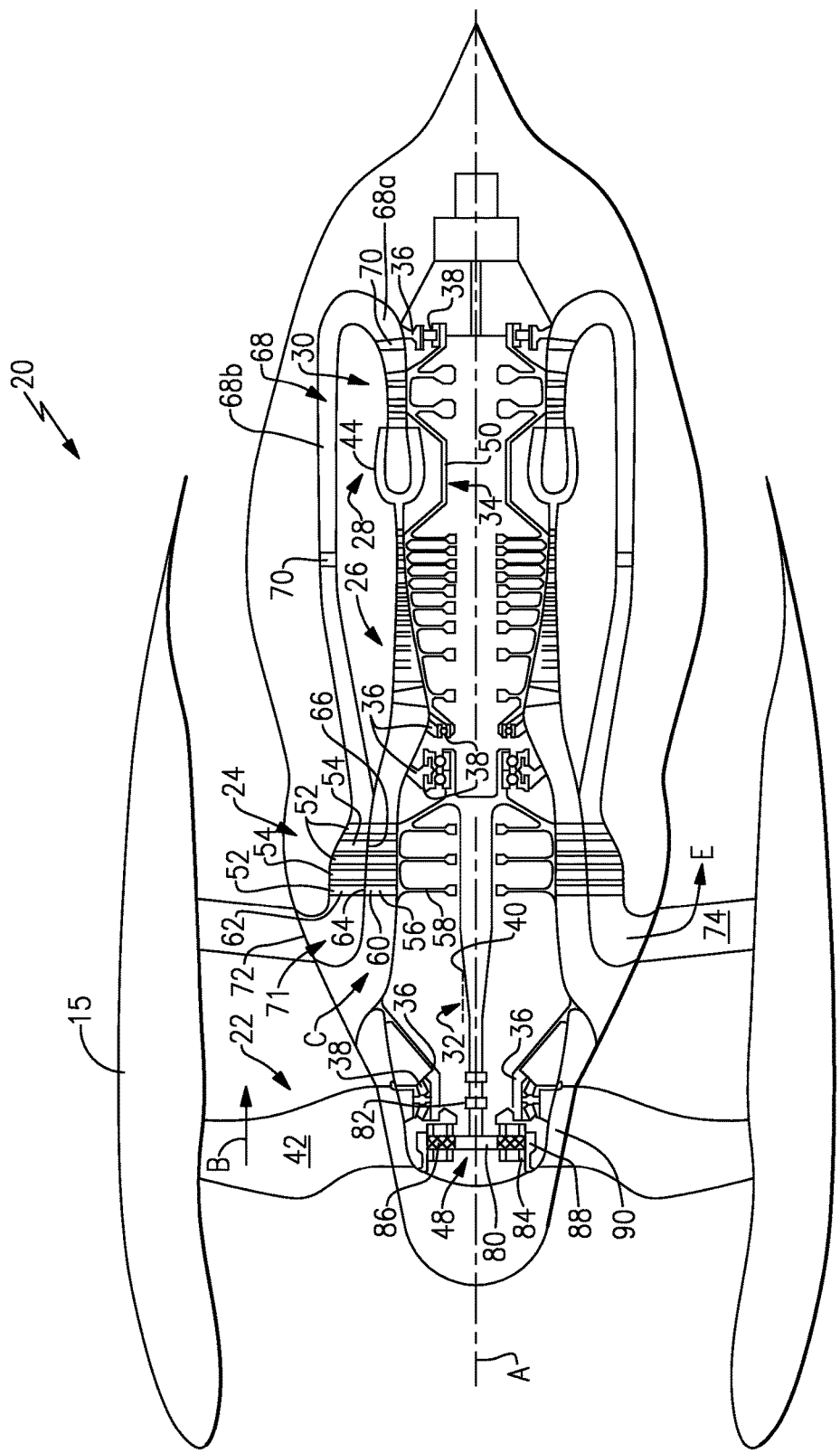
FIG. 1 is a schematic view of an example gas turbine engine.

FIG. 1 schematically illustrates a gas turbine engine 20. The gas turbine engine 20 disclosed herein incorporates a fan section 22, a turbo-compressor section 24, a high pressure compressor 26, combustor section 28, and a high pressure turbine 30. The fan section 22 drives air along a bypass flow path B in a bypass duct defined within a nacelle 15. The turbo-compressor section 24 and the high pressure compressor 26 drive air along a core airflow path C for compression and communication into the combustor section 28 then expansion through the high pressure turbine 30 and the turbo-compressor section 24.

The exemplary engine 20 generally includes a low speed spool 32 and a high speed spool 34 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application. In another example, the low speed spool 32 could rotate about a first axis and the high speed spool 34 could each rotate about a second axis that is spaced both laterally and axially from the first axis.

The low speed spool 32 generally includes a low speed shaft 40 that interconnects a fan 42 and the turbo-compressor section 24. The low speed shaft 40 is connected to the fan 42 through a speed change mechanism, which in exemplary gas turbine engine 20 is illustrated as a geared architecture 48, to drive the fan 42 at a lower speed than the low speed spool 32. The high speed spool 34 includes a high speed shaft 50 that interconnects the high pressure compressor 26 and the high pressure turbine 30. A combustor 44 is arranged in the exemplary gas turbine 20 between the high pressure compressor 26 and the high pressure turbine 30.

The turbo-compressor section 24 includes multiple rotor stages 52 separated by vanes 54. Each of the rotor stages 52 include turbo-compressor blades 56 surrounding and attached to a turbo-compressor disk 58. The turbo-compressor blades 56 each include a low pressure compressor portion 60 separated from a low pressure turbine portion 62 by a shroud 64. Each of the vanes 54 includes a shroud 66 for separating the airflow through the turbo-compressor section 24 between the low pressure compressor portion 60 and the low pressure turbine portion 62.

In the illustrated example, the turbo-compressor section 24 includes three rotor stages 52 each separated from an adjacent stage by an array of the vanes 54. In another example, the turbo-compressor section 24 could include more or than less three rotor stages 52 or an array of the vanes 54 downstream of the rotor stage 52.

Figure 2:
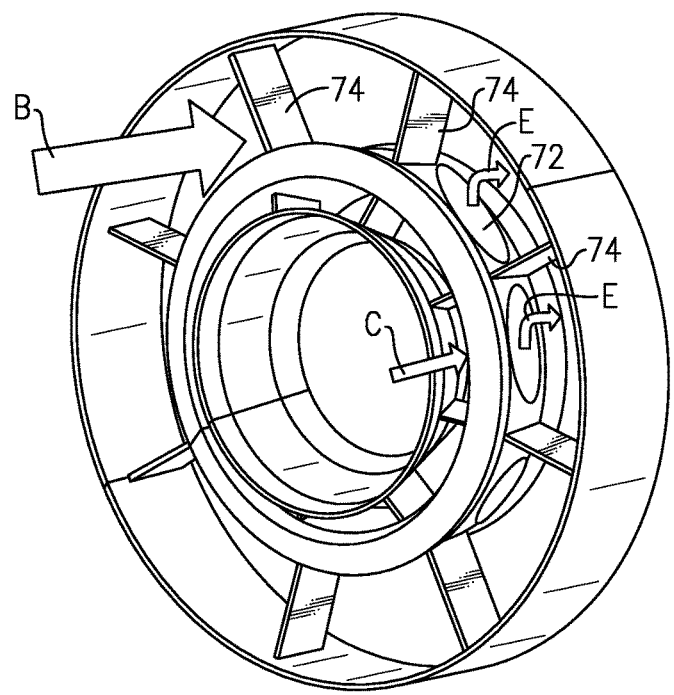
FIG. 2 is a perspective view of a bypass duct of the gas turbine engine of FIG. 1.
Figure 3:
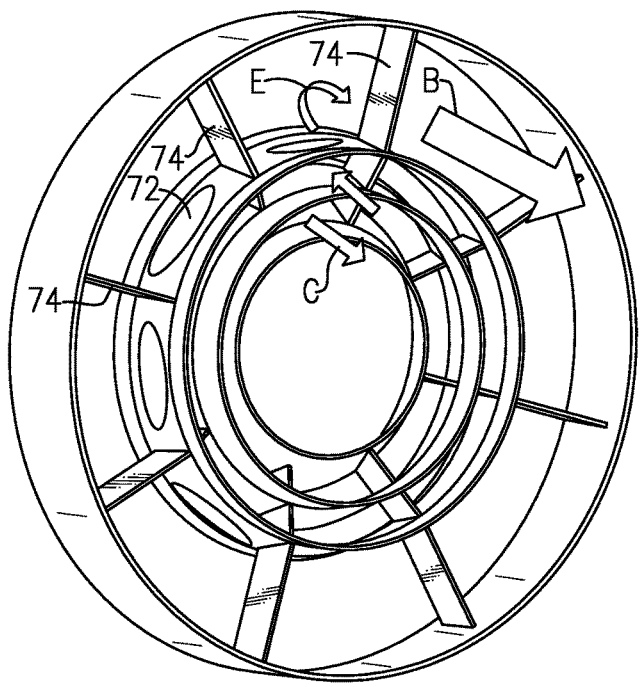
FIG. 3 is another perspective view of the bypass duct of the gas turbine engine of FIG. 1.

The core airflow path C is compressed by the low pressure compressor portion 60 of the turbo-compressor section 24 then the high pressure compressor 26, mixed and burned with fuel in the combustor 44, then expanded over the high pressure turbine 30 and low pressure turbine portion 62 of the turbo-compressor section 24. The mid-turbine passage 68 is located downstream of the high pressure turbine 30 and upstream of the low pressure turbine portion 62 of the turbo-compressor section 24. The mid-turbine passage 68 includes airfoils 70 for directing the core airflow through the mid-turbine passage 68. The mid-turbine passage 68 could include a plurality of individual passages or a plenum that forms a continuous passage circumferential passage surrounding the high pressure compressor 26, combustor section 28, and high pressure turbine 30. The mid-turbine passage 68 includes a first portion 68a extending downstream from the high pressure turbine 30 and a second portion 68b that turns and extends upstream toward the turbo-compressor section 24. Once the core airflow has passed through the mid-turbine passage 68 and further expanded over the low pressure turbine portion 62 of the turbo-compressor section 24, the core airflow passes through an exhaust passage 71. The exhaust core airflow exits the exhaust passage 71 through an exhaust duct 72 into the bypass airflow B as shown by shown by the exhaust core airflow E in FIGS. 2 and 3. In the illustrated example, there is a single exhaust duct 72 exhausting the exhaust core airflow E into the bypass airflow B between adjacent fan exit guide vanes 74. In another example, more than one exhaust duct 72 could be located between the adjacent fan exit guide vanes 74.

It will be appreciated that each of the positions of the fan section 22, the turbo-compressor section 24, the high pressure compressor 26, the combustor section 28, the high pressure turbine 30, and the geared architecture 48 may be varied. For example, the geared architecture 48 may be axially aligned with the turbo-compressor section 24 or the fan section 22 may be positioned forward or aft of the location of the geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine portion 62 has a pressure ratio that is greater than about five. In one disclosed embodiment, the engine 20 bypass ratio is greater than about ten (10:1), the fan diameter is significantly larger than that of the low pressure compressor portion 60, and the low pressure turbine portion 62 has a pressure ratio that is greater than about five 5:1. Low pressure turbine portion 62 pressure ratio is pressure measured prior to inlet of low pressure turbine portion 62 as related to the pressure at the outlet of the low pressure turbine portion prior to the exhaust passage 71. The geared architecture 48 may as also be a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

In the illustrated example, the geared architecture 48 is a star gear system. The geared architecture 48 includes a sun gear 80 that is connected to the low speed shaft 40 through a flexible coupling 82. A carrier 84 supports a plurality of star gears 86 and is attached to the engine static structure 36 to prevent the carrier 84 from rotating. A ring gear 88 is located radially outward from the carrier 84 and engages the plurality of star gears 86. The ring gear 88 is attached to a fan hub 90 to rotate the fan 42. The fan hub 90 is supported by the bearing systems 38, such as a pair of tapered roller bearings.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 meters/second).

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a fan section;
a turbo-compressor section connected to the fan section through a speed change mechanism, wherein the turbo-compressor section includes at least one rotor stage having a plurality of blades with each of the plurality of blades having a low pressure compressor portion and a low pressure turbine portion; and
a high speed spool and a low speed spool, wherein the low speed spool connects the turbo-compressor section to the speed change mechanism and the high speed spool connects a high pressure compressor and a high pressure turbine.

2. The gas turbine engine of claim 1, wherein the low pressure compressor portion is located radially inward from the low pressure turbine portion.

3. The gas turbine engine of claim 2, further comprising a shroud separating the low pressure compressor portion and the low pressure turbine portion.

4. The gas turbine engine of claim 1, wherein the low speed spool is spaced axially forward of the high speed spool.

5. The gas turbine engine of claim 1, further comprising a mid-turbine passage having a first portion extending downstream from the high pressure turbine and a second portion extending upstream toward the turbo-compressor section.

6. The gas turbine engine of claim 5, wherein the mid-turbine passage includes a plurality of ducts.

7. The gas turbine engine of claim 5, wherein the mid-turbine passage includes a plenum.

8. The gas turbine engine of claim 5, further comprising an exhaust passage fluidly connecting the turbo-compressor section to a bypass air duct.

9. A method of operating a gas turbine engine comprising:
rotating a turbo-compressor section including a plurality of turbo-compressor blades attached to a low speed spool, wherein each of the plurality of turbo-compressor blades have a low pressure compressor portion and a low pressure turbine portion; and reducing a rotational output of the low speed spool with a speed change mechanism to rotate a fan section, wherein the low speed spool connects the turbo-compressor blades to the speed change mechanism and the high speed spool connects a high pressure compressor and a high pressure turbine.

10. The method of claim 9, wherein the low pressure compressor portion is located radially inward from the low pressure turbine portion.

11. The method of claim 10, further comprising a shroud separating the low pressure compressor portion and the low pressure turbine portion.

* * * * *